(12) United States Patent
Thrun et al.

(10) Patent No.: US 11,111,030 B2
(45) Date of Patent: Sep. 7, 2021

(54) REACTIONLESS FREE-SPINNING MOTOR WITH DUAL PROPELLERS

(71) Applicant: Kitty Hawk Corporation, Palo Alto, CA (US)

(72) Inventors: Sebastian Thrun, Los Altos Hills, CA (US); Christopher Scott Saunders, San Jose, CA (US); Benjamin Otto Berry, Mountain View, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 17/150,332

(22) Filed: Jan. 15, 2021

(65) Prior Publication Data
US 2021/0221527 A1    Jul. 22, 2021

Related U.S. Application Data

(60) Provisional application No. 62/962,630, filed on Jan. 17, 2020.

(51) Int. Cl.
*B64D 35/06* (2006.01)
*B64C 11/46* (2006.01)
*B64D 27/24* (2006.01)
*B64C 29/00* (2006.01)

(52) U.S. Cl.
CPC .............. *B64D 35/06* (2013.01); *B64C 11/46* (2013.01); *B64D 27/24* (2013.01); *B64C 29/0033* (2013.01)

(58) Field of Classification Search
CPC .......... B64C 11/46; B64C 27/16; B64D 35/06
See application file for complete search history.

(56) References Cited

U.S. PATENT DOCUMENTS

| | | | |
|---|---|---|---|
| 7,032,859 B2 | 4/2006 | Mohr | |
| 8,464,511 B1 * | 6/2013 | Ribarov | H02K 7/14 60/226.1 |
| 10,116,187 B1 | 10/2018 | Wishart | |
| 10,293,932 B2 * | 5/2019 | Alzahrani | B64C 39/024 |
| 10,633,083 B2 * | 4/2020 | Oberndorfer | B64D 35/06 |
| 2009/0289516 A1 | 11/2009 | Hopewell | |
| 2016/0211720 A1 * | 7/2016 | Koegler | F16C 1/00 |
| 2019/0092459 A1 | 3/2019 | Oberndorfer | |
| 2020/0216183 A1 * | 7/2020 | Veilleux, Jr. | H02K 7/116 |
| 2020/0227988 A1 * | 7/2020 | Zhu | B64C 11/46 |

FOREIGN PATENT DOCUMENTS

DE    102011053787 A1 *  3/2013 ............. B64C 11/48

* cited by examiner

*Primary Examiner* — Philip J Bonzell
*Assistant Examiner* — Michael B. Kreiner
(74) *Attorney, Agent, or Firm* — Van Pelt, Yi & James LLP (57) ABSTRACT

A system which includes a first propeller, a second propeller, an electromagnetic field emitter that is coupled to the first propeller, and an electromagnetic field receptor that is coupled to the second propeller. The electromagnetic field emitter emits an electromagnetic field and in response to the electromagnetic field, the electromagnetic field receptor and the second propeller rotate in a first rotational direction and the electromagnetic field emitter and the first propeller rotate in a second and counter-rotational direction.

14 Claims, 6 Drawing Sheets

FIG. 5B

REACTIONLESS FREE-SPINNING MOTOR WITH DUAL PROPELLERS

CROSS REFERENCE TO OTHER APPLICATIONS

This application claims priority to U.S. Provisional Patent Application No. 62/962,630 entitled FREE SPINNING MOTOR WITH DUAL PROPELLERS filed Jan. 17, 2020 which is incorporated herein by reference for all purposes.

BACKGROUND OF THE INVENTION

New types of battery-powered (i.e., electric) aircraft are being developed. As with vehicles (regardless of whether they are battery powered or have a combustion engine), the range and energy efficiency of the vehicle is an important performance metric. New types of motors and/or propulsion systems which can improve these metrics of battery-powered aircraft would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a propulsion system with a reactionless free-spinning motor with dual propellers are described herein. In some embodiments, the system includes a first propeller, a second propeller, an electromagnetic field emitter that is coupled to the first propeller, and an electromagnetic field receptor that is coupled to the second propeller where the electromagnetic field emitter emits an electromagnetic field and in response to the electromagnetic field, the electromagnetic field receptor and the second propeller rotate in a first rotational direction and the electromagnetic field emitter and the first propeller rotate in a second and counter-rotational direction. Both the emitter and the receptor are permitted to rotate freely so there is no stationary part of the system; another way to say this is that there is no stator. In a typical motor, the field emitting portion of the motor forms the stator, and the field receptor would be the rotor, typically implemented with permanent magnets or an induction rotor core. As will be described in more detail below, this arrangement reduces the ratio of motors to propellers from 1:1 to 1:2 where a single, free-spinning motor powers two propellers. The following figures describe various embodiments of this.

Figure 1A:
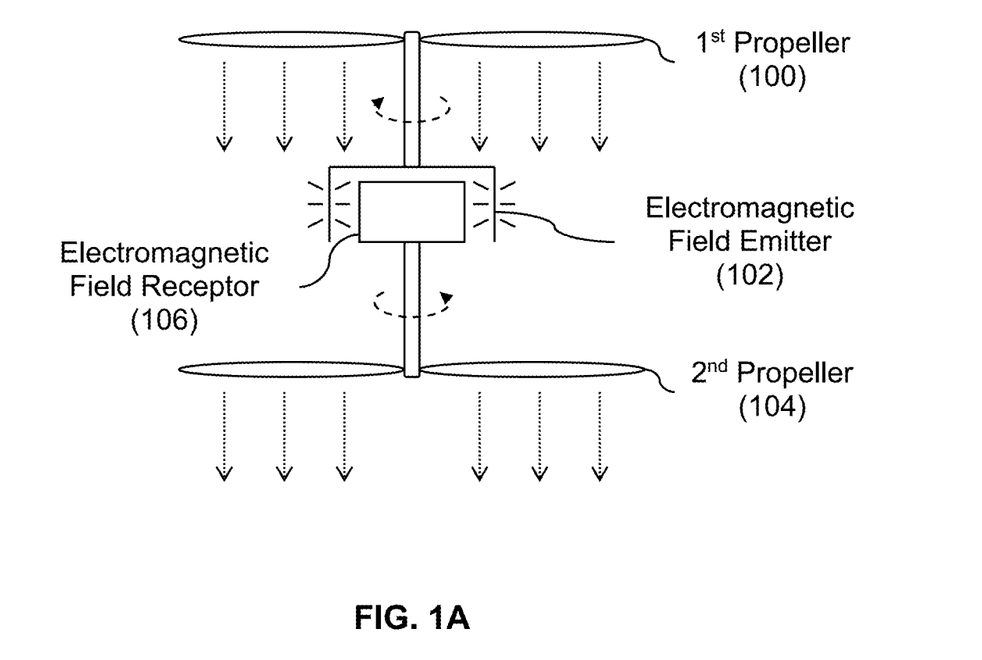
FIG. 1A is a side-view diagram illustrating an embodiment of a free-spinning motor with dual propellers.

FIG. 1A is a side-view diagram illustrating an embodiment of a free-spinning motor with dual propellers. In this example, there are two propellers: a first propeller (100), which is coupled to an electromagnetic field emitter (102) via a shaft, and a second propeller (104), which is coupled to an electromagnetic field receptor (106) via another shaft. To rotate the two propellers (100 and 104) in this example, the emitter (102) generates or otherwise emits a magnetic field using or in response to an electric current. The receptor (in this example, the cylindrical sidewall) is made of or otherwise includes (at least in this example) one or more materials which are attracted to or repelled by the generated magnetic field (e.g., a magnet, metal, coils, etc.). In response to the generated electromagnetic field from the emitter (102), the receptor (106) rotates in a first orientation (in this example, clockwise when looking down from above). The second propeller (104), which is coupled to the receptor (106) via the shaft, similarly spins in that orientation, producing thrust and/or a lift (in this example, downward).

In this example, the motor (which comprises the electromagnetic field emitter (102) and the electromagnetic field receptor (106)) is free-spinning where both emitter and the receptor are permitted to rotate. In contrast, a traditional motor would have one of those parts be stationary (e.g., the stator) and the other part would be permitted to rotate (e.g., the rotor). As such, in response to the torque produced on the receptor, the emitter (102) will spin in the opposite (e.g. counter-axial) orientation as the receptor (104). This causes the first propeller (100), which is coupled to the emitter (100) via a shaft, to spin and produce thrust and/or lift as well.

The emitter (102) and its coupled parts (e.g., including the first propeller (100)) and the receptor (106) and its coupled parts (e.g., including the second propeller (104)) will maintain rotational equilibrium. As will be described in more detail below, in some embodiments, the emitter, the receptor, the propellers, and/or some other part may be designed with a specific weight, mass, moment, and/or aerodynamic reaction torque distribution to achieve some desired property or characteristic (e.g., maintain rotational equilibrium while also achieving some desired performance, such as with respect to thrust, rotational speed, etc.).

In this particular example, the two propellers are coaxial and therefore in addition to rotating in counter-rotational directions, the two propellers also rotate counter-axially. As will be described in more detail below A benefit to the free-spinning motor system with dual propellers described herein is that the ratio of propellers to motors improves from 1 (e.g., traditional) motor (e.g., with a stator and rotor) to 1 propeller to 1 (free-spinning) motor to 2 propellers. A motor significantly outweighs a propeller and so being able to power more propellers with a fixed or given number of motors is a significant weight savings (e.g., even with the added weight of certain parts such as a slip ring which is required due to the lack of a stator). To put it more specifically, what this arrangement achieves is a higher total propeller torque per total motor weight (e.g., specific torque), and this improvement may not necessarily be limited to configurations where a motor is eliminated (that is, it may be possible to achieve this benefit or improvement without completely eliminating a motor, such as when propeller weight might be significantly reduced due to using a pair of lower diameter propellers). In any case, however the weight savings is achieved, it translates into an increased flight range. To ensure that the slip ring does not offset the benefit of the eliminated motor, the battery may be designed (e.g., from the ground up) with a higher voltage and motor may be designed (e.g., from the ground up) with a higher torque constant, both of which enable a smaller and therefore lighter slip rings to be used so that the additional weight of the slip ring is less than the weight of a second motor.

It is noted that one constraint on the motors and propellers shown here is that they are driven by the same torque. In other words, the propellers cannot be controlled independently (e.g., since there is a single motor with a single motor control signal going to it). Another constraint is that the propellers are coaxial and therefore the lower or downstream propeller will operate in the wake or induced flow of the upper or upstream propeller. As such, the lower or downstream propeller may be designed to operate in the wash of the other (e.g., the downstream propeller is subject to the induced flow and turbulence generated by the upstream propeller.) Some examples of this are described in more detail below.

Another benefit to the free-spinning motor system with dual propellers is that the fuselage is not subject to the reaction torque. In some design configurations, this may eliminate the need for counter torque devices and/or weighty structural elements (e.g., used to structurally reinforce portions of the vehicle which the reaction torque would affect or act on).

Figure 1B:
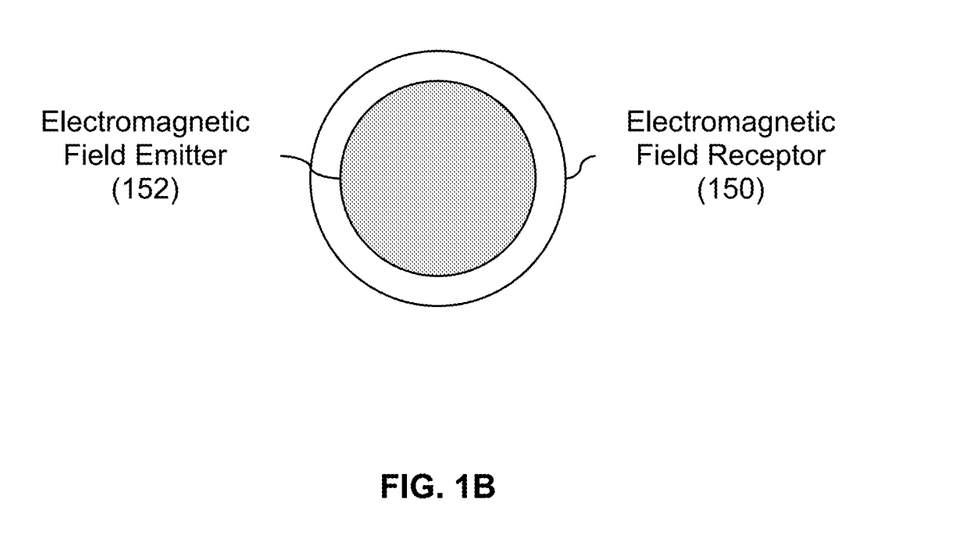
FIG. 1B is top-view diagram illustrating an embodiment of a free-spinning motor where the electromagnetic field receptor surrounds the electromagnetic field emitter.

It is noted that the arrangement shown here is merely exemplary and is not intended to be limiting. For example, in FIG. 1A, the electromagnetic field emitter (102) surrounds the electromagnetic field receptor (106). In some embodiments, the arrangement is reversed. For example, FIG. 1B is top-view diagram illustrating an embodiment of a free-spinning motor where the electromagnetic field receptor (150) surrounds the electromagnetic field emitter (152). For example, the emitter may require more and/or larger components than the more receptor and the interior of the inner cylinder may be a convenient place to put those components. Other design considerations may suggest the other arrangement.

Returning to FIG. 1A, in some embodiments, the first propeller (100) and the second propeller (104) have different blade designs (e.g. blade length, width, and/or angle). For example, this would enable/result in higher system efficiency due to the two propellers rotating at different speeds, and due to different aerodynamic environments (e.g., inflow velocity). To put it another way, the bottom blades are subject to the wake of the upper blades, as described above. In some embodiments, the bottom blades are designed (e.g., through blade twist and/or blade angle selection) to be better able to handle the wake from the upper blades. Similarly, the blade length of the lower blades may be longer to take advantage of the narrowing wake so that the tips of the bottom blades are operating outside of the wake from the upper blades. Naturally, static and dynamic equilibrium considerations (e.g., the upper and lower motors and propellers must have same torque) and other design and/or tradeoff considerations may be taken into consideration. Other blade or propeller parameters which may be different between the two (e.g., upper and lower) include solidity, taper, airfoil selection, blade count, etc. In general, altering one or more of such parameters alters the aerodynamic torque applied to the blade and moment of inertia of the blade which alters its dynamic and static response to an input torque.

Figure 1C:
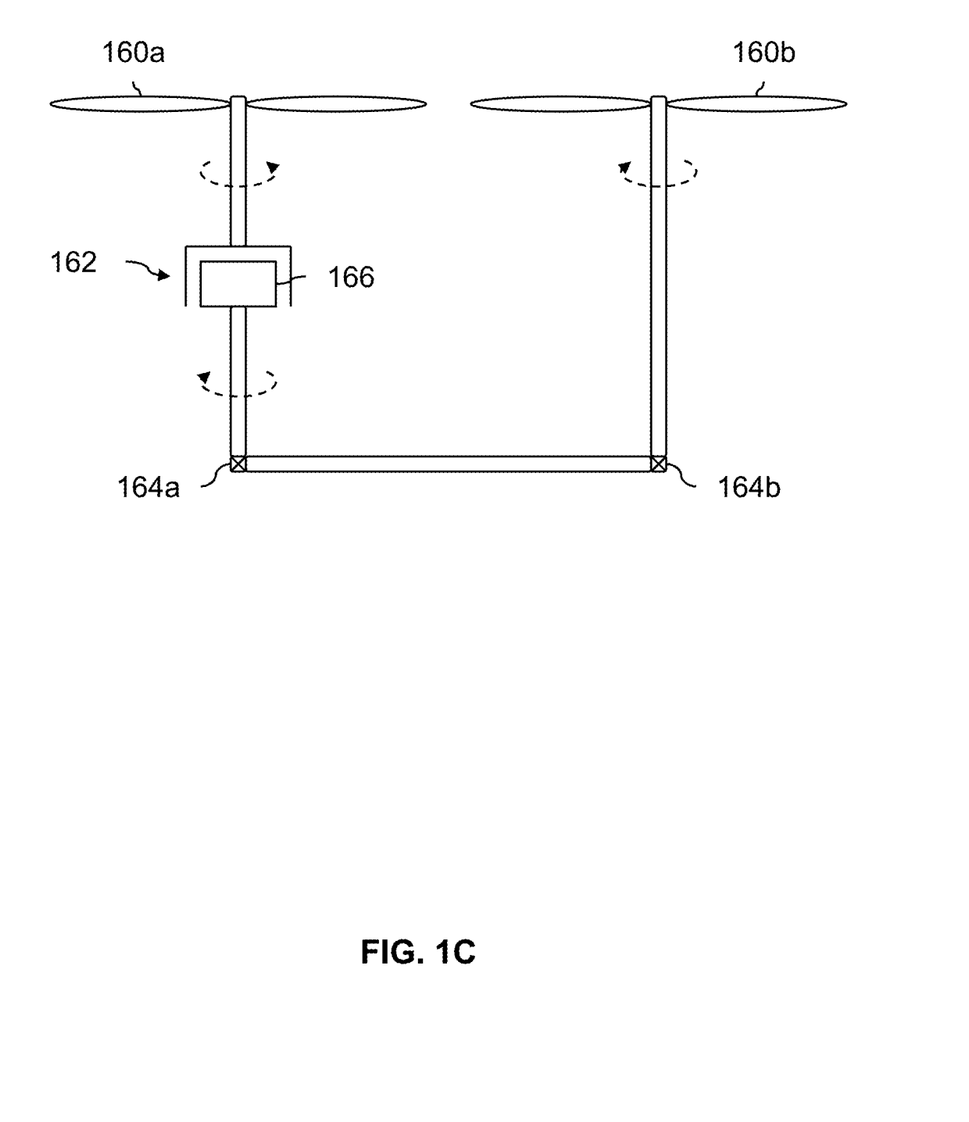
FIG. 1C shows a second embodiment of a free-spinning motor with dual propellers.

FIG. 1C shows a second embodiment of a free-spinning motor with dual propellers. In this example, the blades of the two propellers (160a and 160b) rotate in the same horizontal plane while using the same motor (162). In this example, there are two mechanical couplings (164a and 164b) (e.g., power transmission mechanisms, gearboxes, and/or belt drives) located between the electromagnetic field receptor (166) and the coupled second propeller (160b) that mechanically reorients the direction of rotation between the electromagnetic field receptor and the second propeller such that the first propeller and the second propeller are counter-rotational but are not co-axial (at least in this example). In some embodiments, this is done on the side of the motor with the first propeller (160a).

One benefit to this configuration is that one propeller is not operating in the wake of the other propeller. Another benefit to this configuration is that it may make it easier to sufficiently elevate all propellers to be above people's heads for safety.

The following figures illustrate some example vehicle configurations which incorporate the exemplary free-spinning motor with dual propellers. These vehicle configurations are merely exemplary and are not intended to be limiting.

Figure 2A:
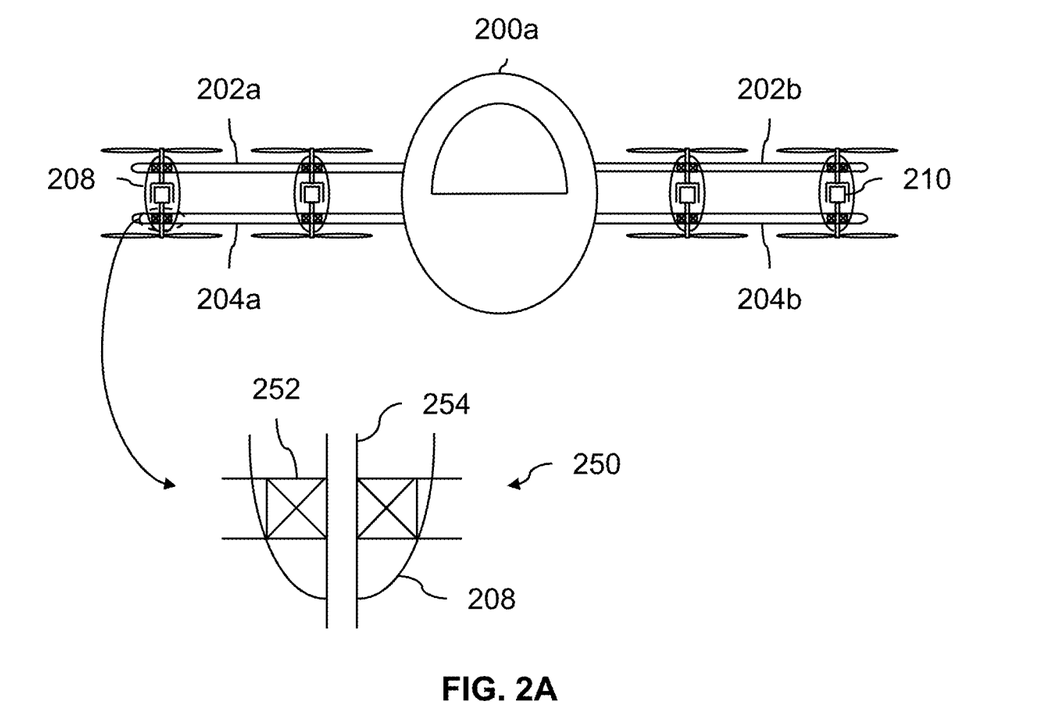
FIG. 2A is a front-view diagram illustrating an embodiment of an electric aircraft with motors and propellers attached laterally relative to a fuselage.

FIG. 2A is a front-view diagram illustrating an embodiment of an electric aircraft with motors and propellers attached laterally relative to a fuselage. In this example, the fuselage (200a) has two booms extending laterally on both sides: an upper boom (202a and 202b) and a lower boom (204a and 204b). As shown in close-up view 250, the booms include bearings (252) which surround the shaft (254) and permitting the shaft to rotate while providing support to the structure.

In this example, the bearings (252), at least part of the shafts (254), and the free-spinning motors (208) are protected by a nacelle or covering (210). For example, this may protect those components from dirt or debris when the vehicle is flying.

In this example, the vehicle is an electric vertical takeoff and landing (eVTOL) vehicle and so the propellers are arranged to rotate around a vertical axis of rotation. In some embodiments, the propellers are arranged to rotate around a longitudinal axis of rotation (e.g., because the vehicle performs a conventional takeoff and landing. The following figure shows one such example.

Figure 2B:
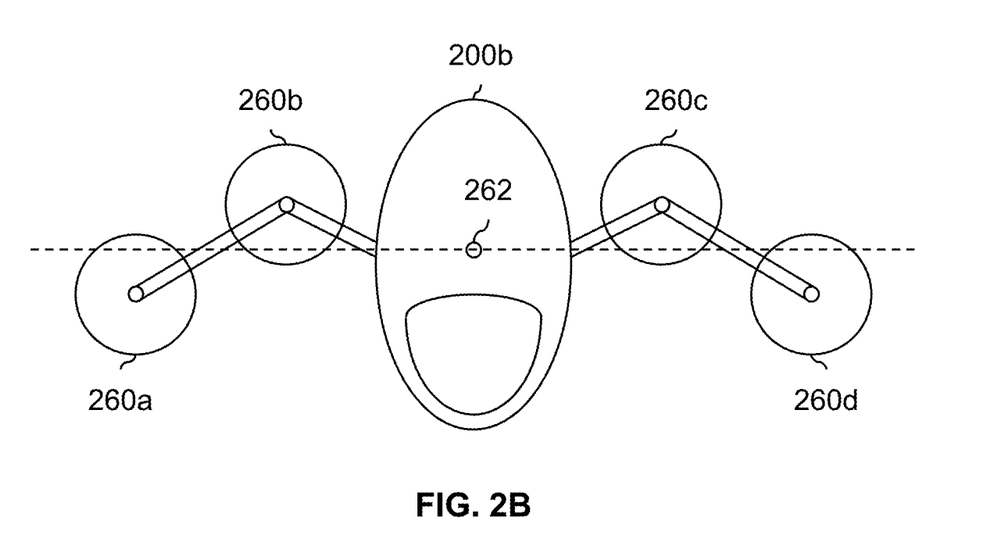
FIG. 2B is a top-view diagram illustrating an embodiment of an electric aircraft with motors and propellers attached laterally relative to a fuselage.

FIG. 2B is a top-view diagram illustrating an embodiment of an electric aircraft with motors and propellers attached laterally relative to a fuselage. FIG. 2B continues the example of FIG. 2A. As shown here, the vehicle is a gullwing where the booms extend backwards from the fuselage (200b). This permits the inner motors and propellers (260b and 260c) to be behind the center of gravity (262).

Extending further outward, the booms then extend forward so that the outer motors and propellers (260a and 260d) are in front of the center of gravity. By positioning the motors and propellers both in front of and behind the center of gravity, this give the vehicle pitch authority (e.g., so that it can tilt forwards and back).

To give the vehicle yaw authority, the motors and propellers may be canted (i.e., they rotate about an axis that is not perfectly vertical). For example, a quadcopter configuration may have two adjacent rotors tilt in (e.g., when looking from above, tilting toward a longitudinal axis that runs from nose to tail) and the other two rotors tilt out.

Figure 3:
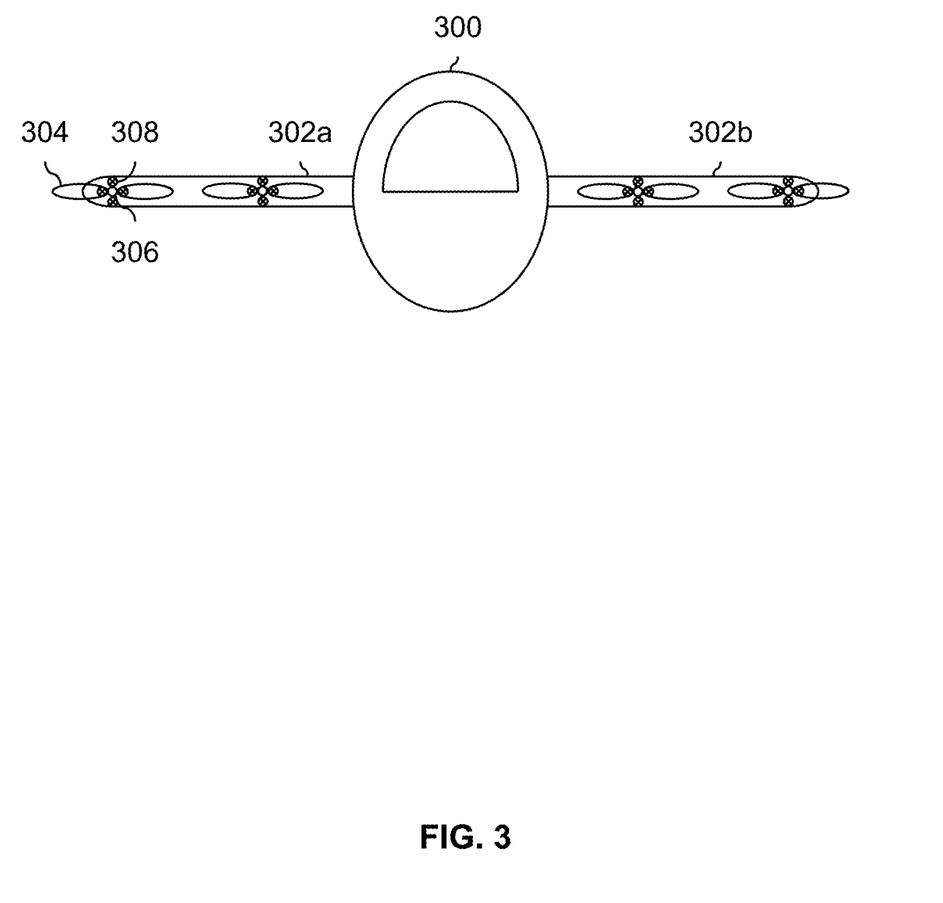
FIG. 3 is a front-view diagram illustrating an embodiment of an electric conventional takeoff and landing aircraft with motors and propellers attached laterally relative to a fuselage.

FIG. 3 is a front-view diagram illustrating an embodiment of an electric conventional takeoff and landing aircraft with motors and propellers attached laterally relative to a fuselage. In this example, the vehicle performs conventional takeoffs and landings and as such there is a main wing (302a and 302b) attached to the fuselage (300). As shown here, the leading propellers (e.g., 304) extend in front of the leading edge of the main wing (302a and 302b) via its respective shaft (e.g., 306) which is oriented longitudinally. The shaft (e.g., 306) runs through the main wing (302a and 302b). Inside of the main wing are bearings (e.g., 308) which surround each shaft (e.g., 306) and permitting the shaft to rotate while providing support to the structure. To preserve the readability of the figure, the free-spinning motors (e.g., each of which includes an electromagnetic field emitter and electromagnetic field receptor) and the blades of the trailing propellers are not shown here.

In some embodiments, the propellers are positioned above the fuselage. For example, this may reduce the footprint of the vehicle required for takeoff and/or landing and/or may be safer since the propellers will be sufficiently high so as not to hit any passers-by when the vehicle is on the ground. The following figure shows one such example.

Figure 4:
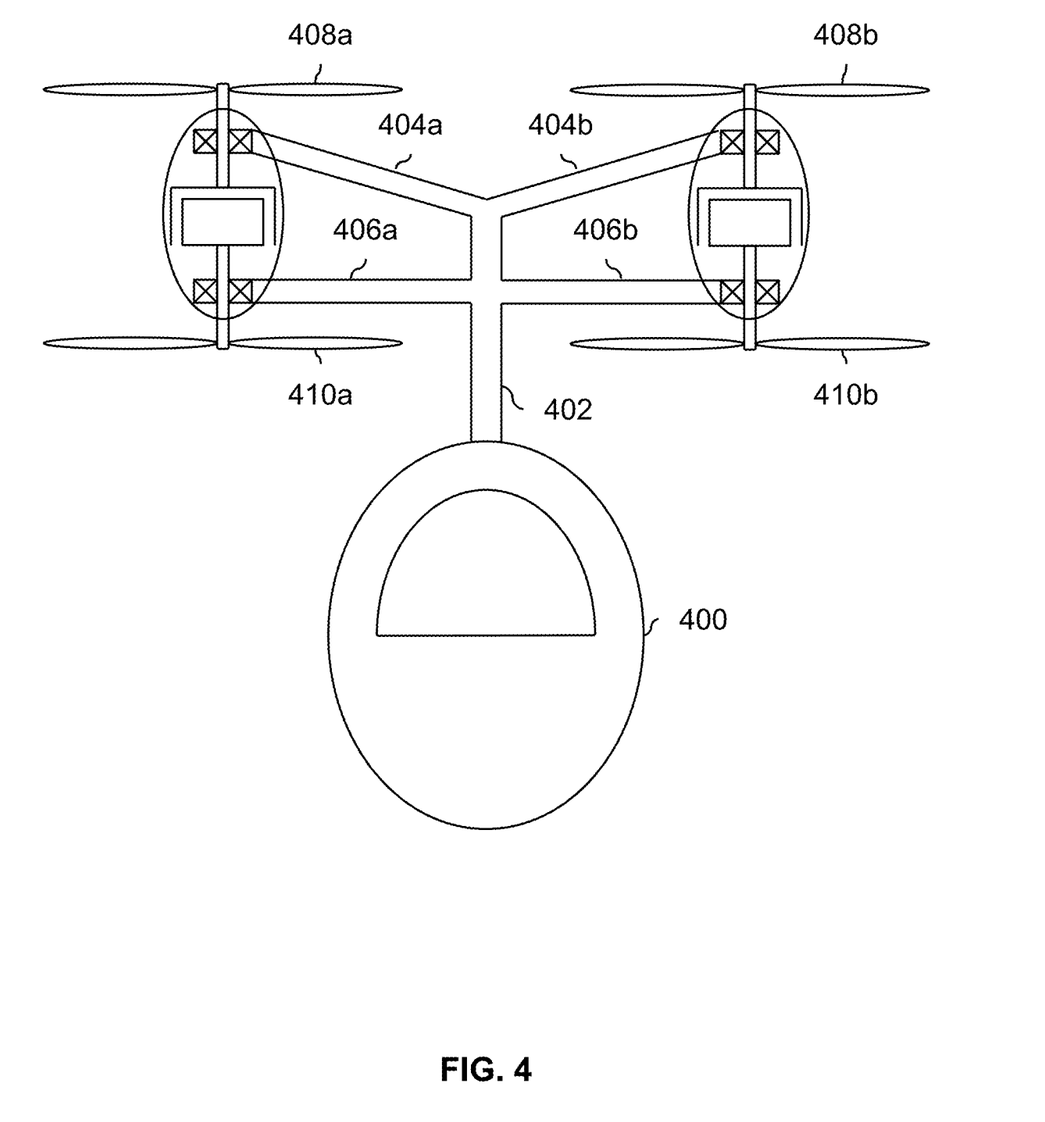
FIG. 4 is a front-view diagram illustrating an embodiment of an eVTOL aircraft with motors and propellers above a fuselage.

FIG. 4 is a front-view diagram illustrating an embodiment of an eVTOL aircraft with motors and propellers above a fuselage. In this example, a main shaft (402) extends upward from the fuselage (400). From the shaft, booms extend outward and hold a pair of free-spinning motors and propellers in place: one on the left side of the fuselage and one on the right side of the fuselage.

The upper booms (404a and 404b) extend diagonally upwards and outwards to hold the vertical shafts connected to the upper rotors (408a and 408b). Lower booms (406a and 406b) extend outwards (e.g., laterally) from the main shaft (402) to hold the vertical shafts connected to the lower rotors (410a and 410b). As with the above examples, bearings permit the shafts (and attached parts) to rotate while providing structural support. As shown here, in some embodiments the propellers rotate in a plane that is above the top of the fuselage.

In some embodiments, the propellers include a swash plate or some other blade pitch control (not shown here) to permit yaw, pitch, and/or roll control so that the vehicle can maneuver. Alternatively, the propellers and motors may be arranged as described above to provide this control or authority (e.g., canted, position motors and propellers in front of and behind the center of mass, etc.).

Figure 5A:
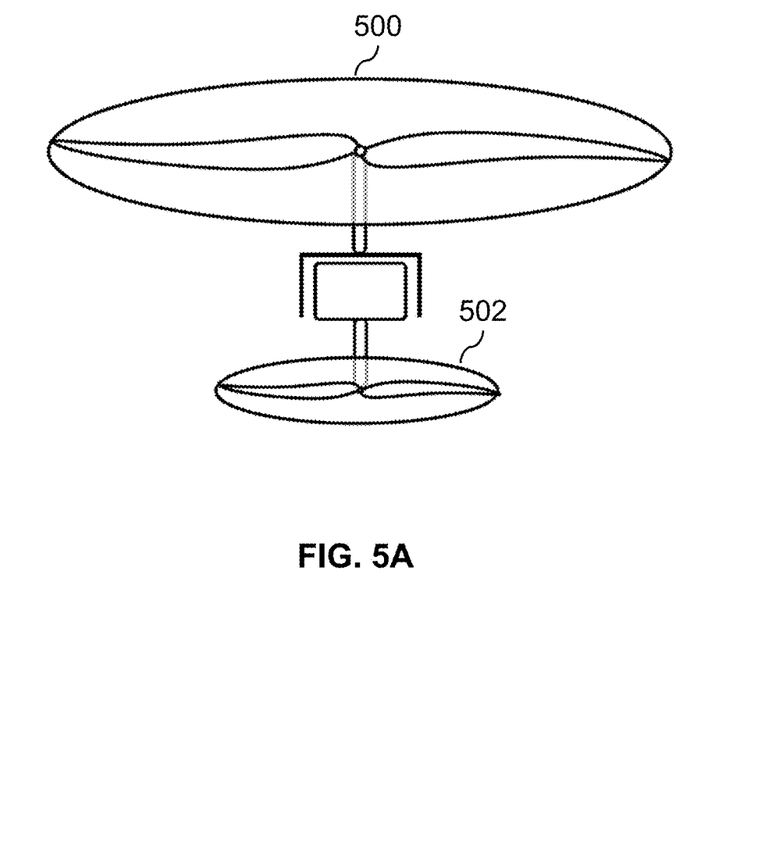
FIG. 5A is a diagram illustrating an embodiment of a free-spinning motor with propellers having different blade lengths.

FIG. 5A is a diagram illustrating an embodiment of a free-spinning motor with propellers having different blade lengths. In this example, the upper propeller (500) has longer blades whereas the lower propeller (502) has shorter blades. Generally speaking, longer blades are desirable for their better aerodynamic efficiency (e.g., more thrust per surface area) and noise performance (e.g., propeller noise is a function of tip speed and longer blades are able to produce the required thrusts at slower speeds and therefore longer blades are quieter) whereas shorter blades are better at maneuvering.

In this example, a change in thrust is desired from the propulsion system and therefore the commanded and controlled torque sent to the free-spinning motor is changed. The change in torque is distributed to the two propellers (500 and 502) and its effects are split where the angular acceleration from the torque split depends on the inertia of the rotary load (that is, the inertia of the particular propeller, which depends upon blade length) and the counter-torque created by its rotation. The following figure shows an example of the different response functions that result.

Figure 5B:
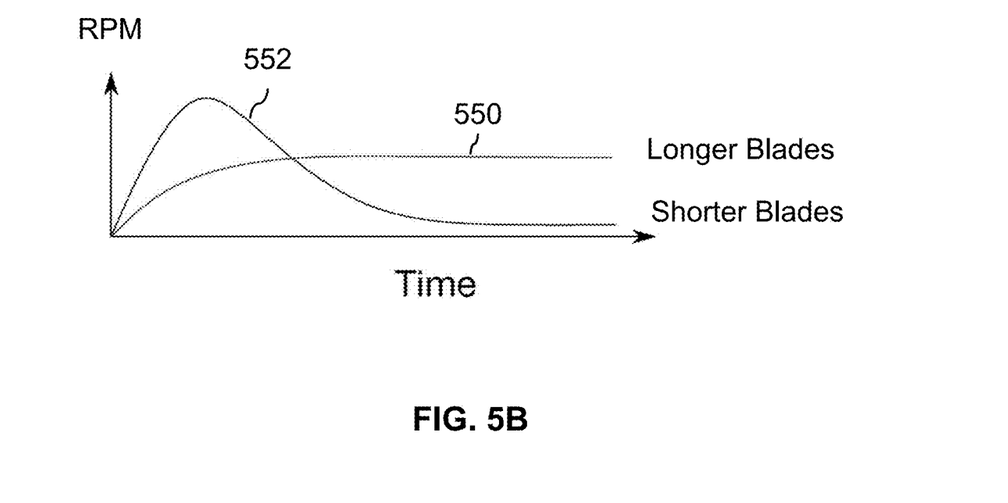
FIG. 5B is a chart illustrating an embodiment of response functions for propellers with different blade lengths.

FIG. 5B is a chart illustrating an embodiment of response functions for propellers with different blade lengths. As described above, the shorter-bladed propeller (e.g., 502 in FIG. 5A) has a smaller inertia whereas the longer-bladed propeller (e.g., 500 in FIG. 5A) has a larger inertia. In some embodiments, in addition to and/or as an alternative to selecting a particular blade length, a propeller's pitch setting(s) (e.g., blade pitch) is/are designed or otherwise selected for a desired response thrust response by the vehicle.

In this example, where a command is issued to the motor that increases the torque output and thus the rotations per minute (RPM) of the propellers via angular acceleration, the smaller propeller would initially accelerate more quickly and yield a fast-responding change in thrust. See, for example, the initial "hump" in the RPM function (552) for the propeller with the shorter blades. As time progresses, the longer-bladed, higher-inertia propeller would eventually accelerate and assume the lifting load. Note, for example, the slower ramping up of the RPM function (550) for the longer-bladed propeller where the speed of the longer-bladed propeller eventually exceeds that of the shorter-bladed propeller. Eventually, the two RPM functions settle into a steady state speed (e.g., assuming no further changes or disturbances to the inputs or the system) where the longer-bladed propeller is rotating at a faster steady-state speed than the shorter-bladed propeller.

To put it another way, the exemplary configuration enables the vehicle to have a single propulsion unit which can provide both a high-bandwidth (e.g., rapid) thrust response (see, e.g., the initial hump of the shorter-bladed RPM function (552)) as well as efficient, steady-state lift production (e.g., the longer-bladed RPM function (550) once that propeller gets up to speed) in a single, high-specific-torque propulsion unit. To put it another way, shorter-bladed propeller may be desirable for their quick responses and/or maneuverability whereas longer-bladed propellers are desirable for lower noise output and its efficient steady-state performance and this configuration offers a bit of both desirable aspects.

It is noted that the manner in which the torque is divided between the two propeller (e.g., the shape of the two response function) may be tuned for advantageous and/or desired effect (e.g., how quickly the longer-bladed propeller takes to get up to speed, the duration and/or height of the initial hump of the shorter-bladed RPM function, the two steady-state speeds, etc.).

Although an alternative solution may be to have a vehicle include a free-spinning motor with a matched set of longer-bladed propellers as well as a free-spinning motor with a matched set of shorter-bladed propellers, the available surfaces on the airframe, vehicle footprint, and/or other space and weight limitations may make using matched propellers unattractive. In such applications, the configuration shown here may be a more desirable option because it is a single system that takes up less space and while offering at least some of the desirable characteristics associated with both types of propellers.

As shown in this example, in some embodiments, the first propeller has a first blade length and the second propeller has a second blade length that is not equal to the first blade length. In some embodiments, the first propeller has a first blade pitch setting and the second propeller has a second blade pitch setting that is not equal to the first blade pitch setting. If both blade length and blade pitch setting are used to tune or otherwise adjust the inertias and aerodynamic counter-torque of the two propellers, then the shorter-bladed propeller would have the higher pitch setting. This permits the lower inertia propeller to accelerate quickly, in order to dynamically respond to changes in commanded torque. The higher blade pitch setting on the smaller diameter propeller creates a situation where the aerodynamic counter-torque response on the smaller diameter propeller is higher in magnitude during transient events than it would be in steady state (see, e.g., the hump in RPM function 552 before steady state). This reversion to steady state occurs when the higher-inertia, large-diameter propeller accelerates to its steady state speed and relieves the torque load on the smaller propeller.

While the examples of propeller radius and blade pitch have been used here as our independent inputs for altering the moment of inertia and aerodynamic counter-torque from the propellers, there are a vast number of options available for tuning these parameters to achieve the desired transient and steady-state propulsive response.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a first propeller;
   a second propeller;
   an electromagnetic field emitter that is coupled to the first propeller;
   an electromagnetic field receptor that is coupled to the second propeller, wherein the electromagnetic field emitter emits an electromagnetic field and in response to the electromagnetic field:
   the electromagnetic field receptor and the second propeller rotate in a first rotational direction; and
   the electromagnetic field emitter and the first propeller rotate in a second and counter-rotational direction; and
   at least one of the following:
   a first mechanical coupling that mechanically reorients a direction of rotation between the electromagnetic field receptor and the second propeller such that the first propeller and the second propeller are not co-axial; or
   a second mechanical coupling that mechanically reorients a direction of rotation between the electromagnetic field emitter and the first propeller such that the first propeller and the second propeller are not co-axial.

2. The system recited in claim 1, wherein:
   the system is included in a vertical takeoff and landing vehicle; and
   the first propeller and the second propeller rotate about a substantially vertical axis of rotation.

3. The system recited in claim 1, wherein:
   the system is included in a vehicle that takes off and lands using wing-borne flight; and
   the first propeller and the second propeller rotate about a substantially longitudinal axis of rotation.

4. The system recited in claim 1, wherein the first propeller and the second propeller rotate in one or more planes that are above a top of a fuselage.

5. The system recited in claim 1, wherein the first propeller has a first blade length and the second propeller has a second blade length that is not equal to the first blade length.

6. The system recited in claim 1, wherein the first propeller has a first blade pitch setting and the second propeller has a second blade pitch setting that is not equal to the first blade pitch setting.

7. The system recited in claim 1, wherein:
   the first propeller has a shorter blade length than the second propeller; and
   the first propeller has a higher blade pitch setting than second propeller.

8. A method, comprising:
   providing a first propeller;
   providing a second propeller;
   providing an electromagnetic field emitter that is coupled to the first propeller;
   providing an electromagnetic field receptor that is coupled to the second propeller, wherein the electromagnetic field emitter emits an electromagnetic field and in response to the electromagnetic field:
   the electromagnetic field receptor and the second propeller rotate in a first rotational direction; and
   the electromagnetic field emitter and the first propeller rotate in a second and counter-rotational direction; and
   providing at least one of the following:
   a first mechanical coupling that mechanically reorients a direction of rotation between the electromagnetic field receptor and the second propeller such that the first propeller and the second propeller are not co-axial; or
   a second mechanical coupling that mechanically reorients a direction of rotation between the electromagnetic field emitter and the first propeller such that the first propeller and the second propeller are not co-axial.

9. The method recited in claim 8, wherein:
the method is performed by a vertical takeoff and landing vehicle; and
the first propeller and the second propeller rotate about a substantially vertical axis of rotation.

10. The method recited in claim 8, wherein:
the method is performed by a vehicle that takes off and lands using wing-borne flight; and
the first propeller and the second propeller rotate about a substantially longitudinal axis of rotation.

11. The method recited in claim 8, wherein the first propeller and the second propeller rotate in one or more planes that are above a top of a fuselage.

12. The method recited in claim 8, wherein the first propeller has a first blade length and the second propeller has a second blade length that is not equal to the first blade length.

13. The method recited in claim 8, wherein the first propeller has a first blade pitch setting and the second propeller has a second blade pitch setting that is not equal to the first blade pitch setting.

14. The method recited in claim 8, wherein:
the first propeller has a shorter blade length than the second propeller; and
the first propeller has a higher blade pitch setting than second propeller.

* * * * *